(12) United States Patent
Chuang (10) Patent No.: US 6,609,723 B2
(45) Date of Patent: Aug. 26, 2003

(54) COLLAPSIBLE TRICYCLE FOR THE USE OF YOUNG CHILDREN

(75) Inventor: A-Chueh Chuang, Tainan (TW)

(73) Assignee: Jin Sun Gee Plastics Co., Ltd., Tainan (TW)

( * ) Notice: Subject to any disclaimer, the term of this patent is extended or adjusted under 35 U.S.C. 154(b) by 58 days.

(21) Appl. No.: 09/993,473

(22) Filed: Nov. 27, 2001

(65) Prior Publication Data

US 2003/0098567 A1 May 29, 2003

(51) Int. Cl.⁷ .................................................. B62K 1/00
(52) U.S. Cl. ....................................... 280/287; 280/278
(58) Field of Search ............................... 280/87.05, 62, 280/639, 642, 278, 283–287

(56) References Cited

U.S. PATENT DOCUMENTS

| | | | | |
|---|---|---|---|---|
| 4,457,529 A | * | 7/1984 | Shamie et al. | 280/278 |
| 5,145,196 A | * | 9/1992 | Langkamp | 280/278 |
| 6,152,473 A | * | 11/2000 | Shih | 280/278 |
| 6,347,824 B1 | * | 2/2002 | Akouri et al. | 296/97.5 |

* cited by examiner

Primary Examiner—Lesley D. Morris
Assistant Examiner—L. Lum
(74) Attorney, Agent, or Firm—Rosenberg, Klein & Lee (57) ABSTRACT

A collapsible tricycle for the use of young children has a front wheel, two rear wheels, a saddle, and a frame, to which the saddle is pivoted. The frame includes a front part, a stationary part secured to the front part, a rear part, and a connecting rod. The stationary part has two parallel walls at the rear portion; the front end of the saddle is pivotally connected to upper portions of the walls; the front portion of rear frame part is pivotally connected to the lower portions of the walls. The rear frame part has two parallel walls defining a space wider than the stationary part such that the stationary part can be partially received in the space when the tricycle is folded, allowing the folded tricycle to be relatively compact. The middle of the saddle is pivoted to the rear frame part. And, the connecting rod is pivoted to both the stationary part and the rear frame from two ends for preventing both from moving relative to each other when the tricycle is ridden. The bottom of the rear part of the saddle is stably supported on the rear frame when the tricycle is stretched. In addition, an engaging rod of the saddle is biased forwards to engage engaging gaps of the rear frame by a spring for preventing the tricycle from being accidentally folded; a pull handle is connected to the engaging rod for a user to pull to disengage the rod from the gaps.

5 Claims, 8 Drawing Sheets

COLLAPSIBLE TRICYCLE FOR THE USE OF YOUNG CHILDREN

BACKGROUND OF THE INVENTION

The present invention relates to a collapsible tricycle for the use of young children, and more particularly, to one which will not be accidentally folded and so there will not be accidental folding that would cause the users to get hurt.

Tricycles are one of the most popular toys for young children. Conventional tricycles for the use of young children includes a rigid frame, a saddle, a front wheel, two rear wheels, a handle bar, and a pair of pedals connected to the front wheel. Riding on such a tricycle is very safe and fun. However, being not able to be collapsed, such a tricycle will take relatively much space when it is not used; when the parents wants to visit their relatives or friends or go out for vacation with their children, and want to carry the children's tricycle in the trunk of the car, the unfoldability of the tricycle is found to be a big drawback, and would cause the tricycle to take too much space or even be not able to be put into the trunk.

Figure 8:
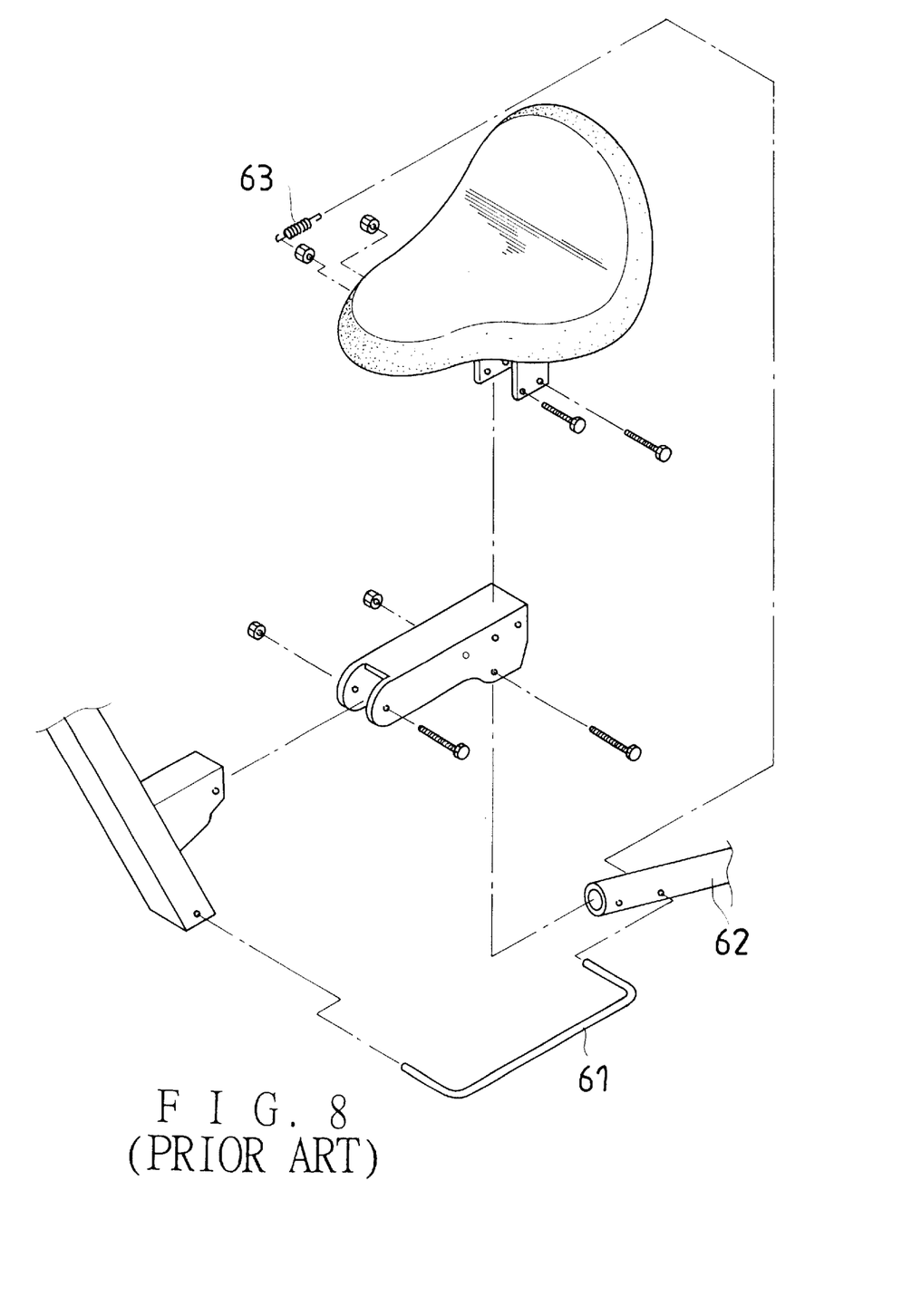
FIG. 8 is a fragmentary exploded perspective view of the conventional tricycle in the Background.
Figure 9:
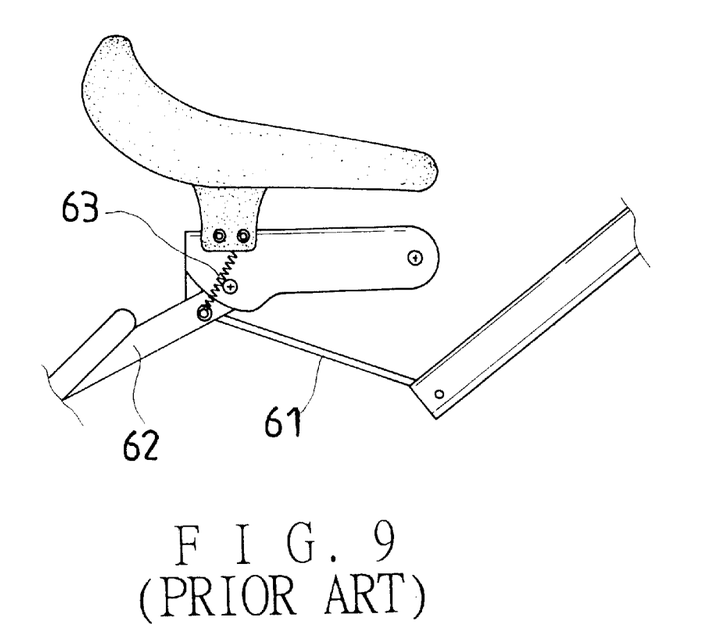
FIG. 9 is a fragmentary side view of the conventional tricycle.
Figure 10:
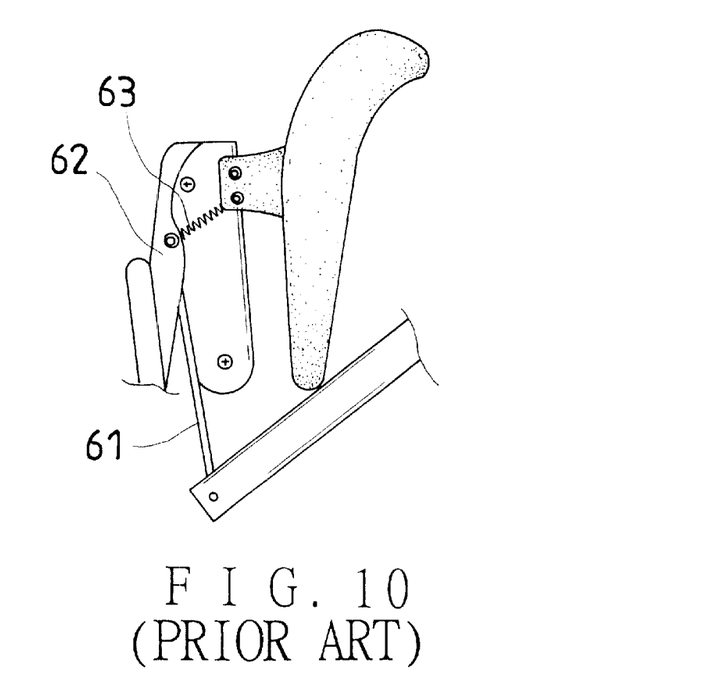
FIG. 10 is a fragmentary side view of the conventional tricycle in the folded position.

And, people living in the cities have relatively limited storage space in their homes, and therefore like to buy objects that can be collapsed for easy storage. Therefore, several collapsible tricycles for the use of young children have been made, including the one which was disclosed in R.O.C. Patent No. 88205478. Although the collapsible tricycle according to this patent is more convenient than the unfoldable ones, it is found to have drawbacks as follows:
1. Referring to FIGS. 8, 9 and 10, which shows a part of the tricycle, when the tricycle is moved along on a ground full of bumps and holes or hits something, the U-shaped connecting rod 43 is likely to fall off the connect rod 41, which is pivoted to the U-shaped rod 43. And, the fall-off the U-shaped rod 43 would cause danger.
2. The spring 44 is the only device provided for keeping the pivoted components of the tricycle in the stretched in-use positions, in other words, there is no other locking device for fixing the pivoted components in position. Therefore, the tricycle is likely to make big noise or even accidentally fold up when it is moved on a ground fill of bumps and holes.
3. The tricycle is not ideally compact when it is in the collapsed position.

SUMMARY OF THE INVENTION

Therefore, it is a first object of the present invention to provide a collapsible tricycle for the use of young children, of which the saddle is held on the frame with ideal stability.

It is a second object of the present invention to provide a collapsible tricycle, of which a rear frame part has engaging gaps for an engaging rod movably connected to the saddle to disengagably engage such that the same can t be accidentally folded.

It is a third object of the present invention to provide a collapsible tricycle, of which a stationary part of the frame can be partially received in the rear frame part when the tricycle is folded such that the folded tricycle has relatively compact size.

The collapsible tricycle includes a front frame part, a stationary frame part secured to the front frame part, a saddle and a rear frame part. A front wheel and handlebars are connected to the front frame part. A pair of rear wheels are connected to the rear frame part.

The rear portion of the stationary frame part has two parallel walls, which have upper, and lower pivotal holes for a front portion of the saddle, and a front end of a connecting rod to be pivoted to respectively.

The rear frame part has two parallel walls, and an interposed board part connected to upper edges of the walls thereof. The walls of the rear frame part defines a front space, and a receiving space behind the front space; the front of the board part is a distance behind the front end of the walls. The connecting rod is pivoted to second pivotal holes of front parts of the walls of the rear frame from a rear end. And, the rear frame part is pivoted to the saddle from first pivotal holes of the front parts of the walls thereof; when the tricycle is in a stretched position, a bottom of the rear part of the saddle is supported on the front edge of the interposed board part. The front edges of the walls of the rear frame part further have engaging gaps for an engaging rod movably connected to the saddle to disengagably engage to secure the saddle in the stretched position.

BRIEF DESCRIPTION OF THE DRAWINGS

The present invention will be better understood by reference to the accompanying drawings, wherein.

DETAILED DESCRIPTION OF THE PREFERRED EMBODIMENT

Figure 1:
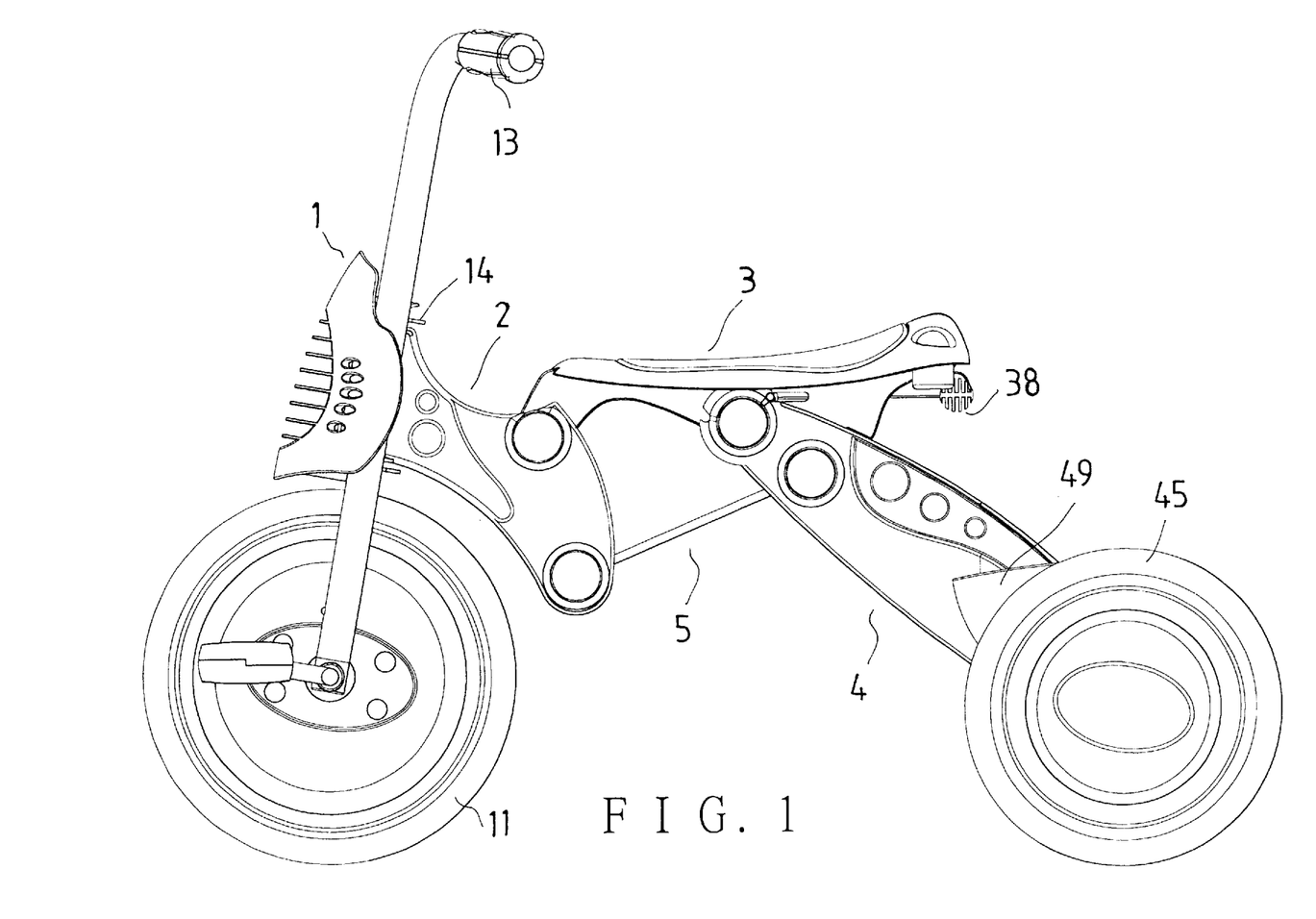
FIG. 1 is a side view of the tricycle of the present invention.

Referring to FIG. 1, a collapsible tricycle of the present invention includes a front frame part 1, a stationary frame part 2, a saddle 3, a rear frame part 4, a connecting rod, a front wheel 11 and two rear wheels 45.

Referring to FIGS. 1 to 4, the front frame part 1 is connected to the front wheel 11 at the lower end, and is provide with handlebars 13 at the lower end for controlling the direction of the tricycle; a pair of pedals 12 are connected to the front wheel 11; the front frame part 1 includes two parallel rods, to which horizontal board-shaped supports 14 are connected.

The stationary frame part 2 includes a connecting hole 21 at the front portion, and a pair of parallel extended walls 22 at the rear portion; the stationary frame part 2 is connected to the front frame part 1 with the connecting hole 21 being disposed between, and connected to, the horizontal board-shaped supports 14 by a bolt (not numbered). The parallel extended walls 22 have upper pivotal holes 221, and lower pivotal holes 222; the upper pivotal holes 221 are aligned with each other, and the lower holes 222 are also aligned with each other; a receiving space 25 is defined by both extended walls 22.

The saddle 3 has a pair of parallel extended parts 31 at the front end, a receiving room 32 at the rear part, a pivotal hole 33, and a pair of parallel opposing elongated slot 35 at the middle portion, and a securing block 34 formed in the receiving room 32; the receiving room 32 further has a lower opening. A control member is movably connected to the saddle 3; the control member includes a spring 36, an engaging rod 37, a pull handle 38, and a connecting part (not numbered) connected to both the engaging rod 37 and the pull handle 38 from two ends. The engaging rod 37 is passed through the elongated slot 35 from two ends. The connecting part is substantially horizontally positioned in the receiving room 32, and is biased towards the front of the saddle 3 by the, spring 36, which is connected to the front end of the connecting part at the front end, and secured in position by the securing block 34 at the rear end. The pull handle 38 is positioned outside the saddle 3 for allowing a user to pull to move the engaging rod 37 along the elongated slot 35; the engaging rod 37 is normally biased to a locking position where it abuts the front ends of the elongated slots 35, and is moved to a unlocking position where it is close to the rear ends of the slots 35 by means of puling the pull handle 38 rearwards.

Figure 2:
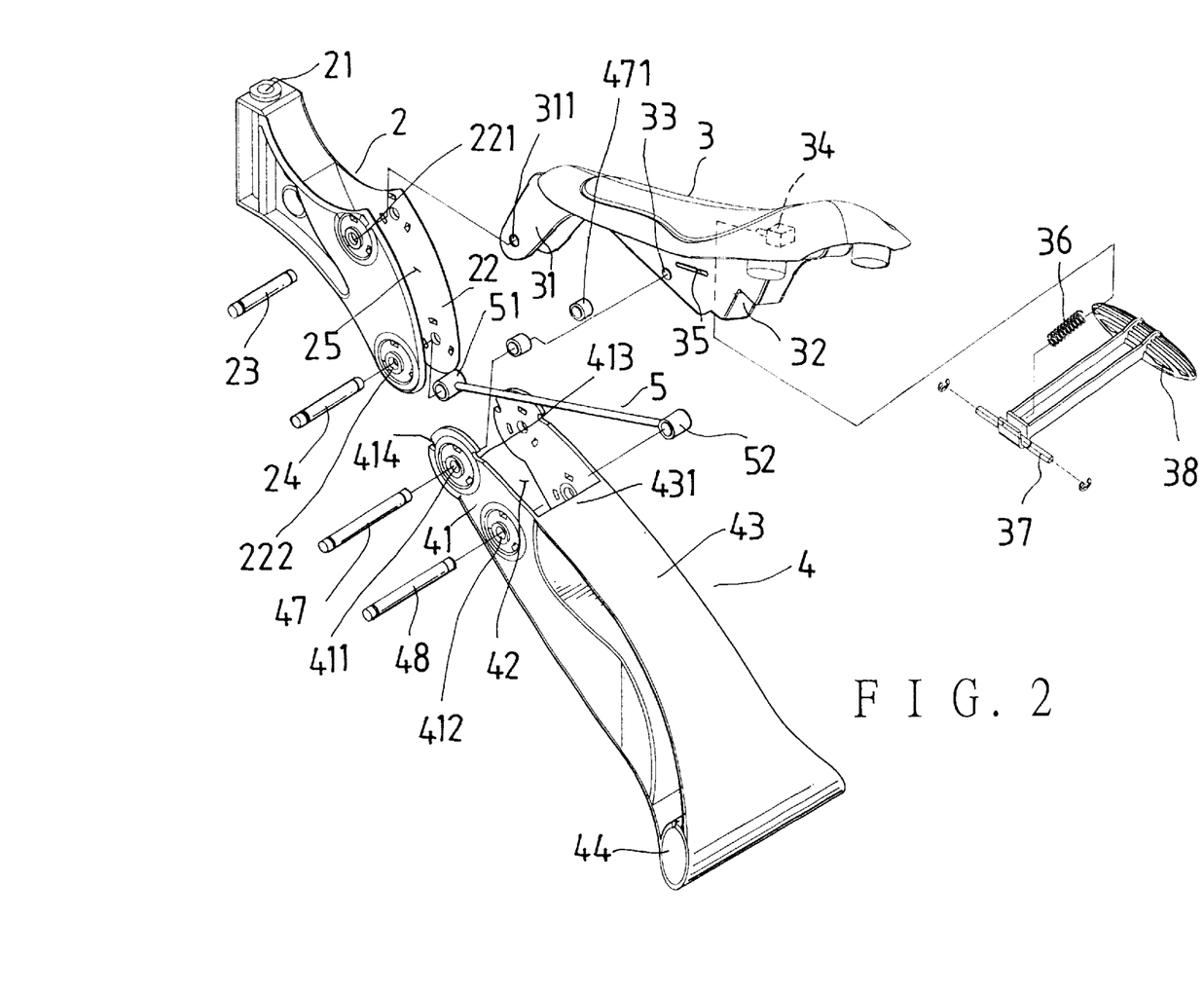
FIG. 2 is a fragmentary exploded perspective view of the tricycle of the present invention.

The rear frame part 4 includes a pair of parallel extended walls 41, a front space 42 defined by the front portions of the extended walls 41, and an inter posed board part 43 connected to the upper edges of both of the extended walls; the front edge of the board part 43 being a distance behind the front end of the extended walls 41 such that the front space 42 has an upper opening. The distance between the parallel walls 41 is bigger than that between the extended walls 22 of the stationary frame part 2. A receiving space (not numbered) is defined by the walls 41 and the interposed board part 43. A transverse hole 44 is formed at the rear end of the rear frame part 4 so that a rear axle 46 can be passed therethrough for connection to the rear wheels 45 The walls 41 further have aligned upper pivotal holes 411, aligned lower pivotal holes 412, first engaging gaps 413 on the upper edges of curved front portions thereof and second engaging gaps 414 on the front edges of the curved front portions (FIG. 2).

The connecting rod 5 includes a middle rod part (not numbered), a front end bushing 51 and a rear end bashing 52; the bushings;51 and 52 are fixedly connected to the middle rod part, and the central holes thereof are perpendicular to the rod part.

Figure 3:
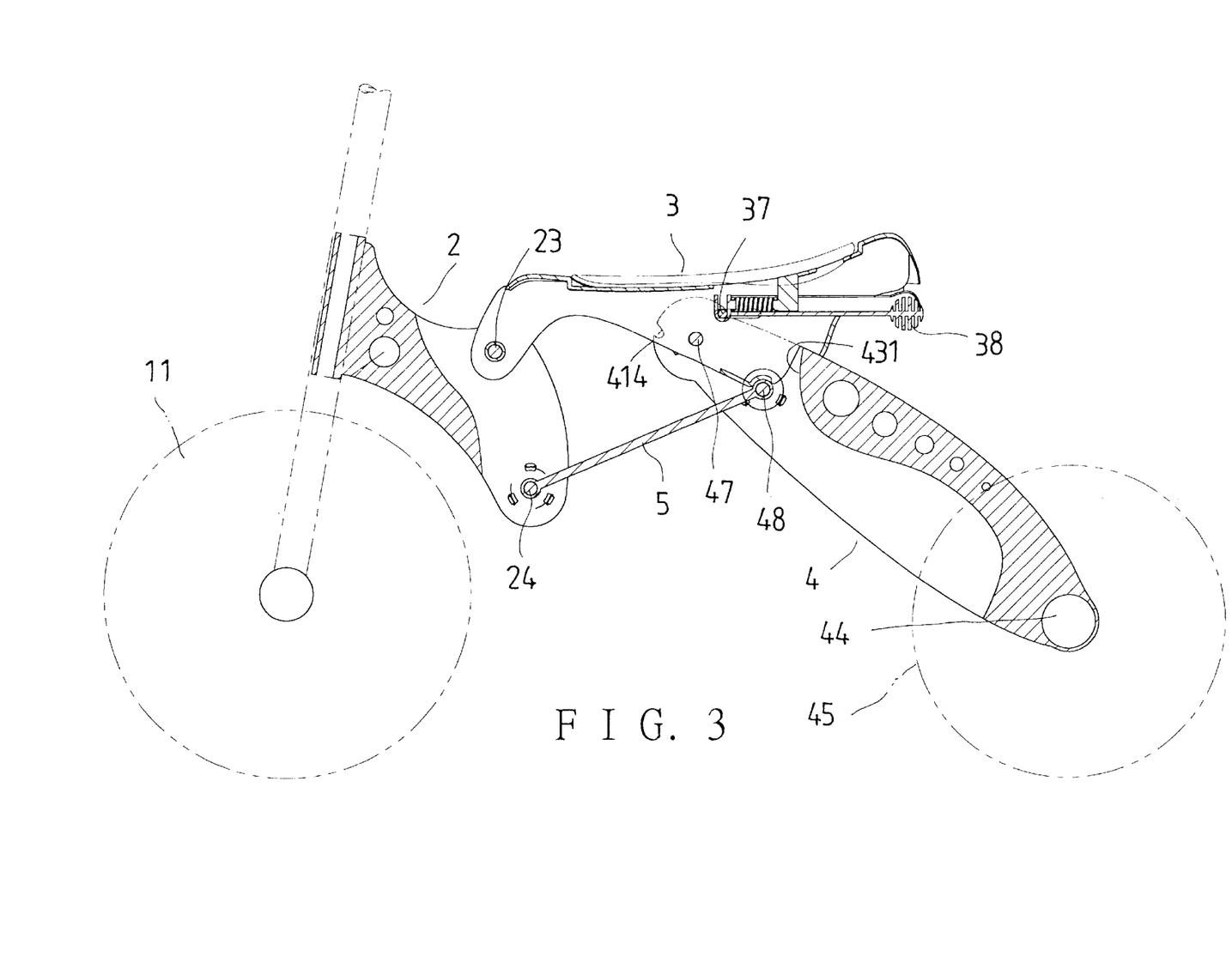
FIG. 3 is a cross-sectional view of the tricycle of the present invention.
Figure 4:
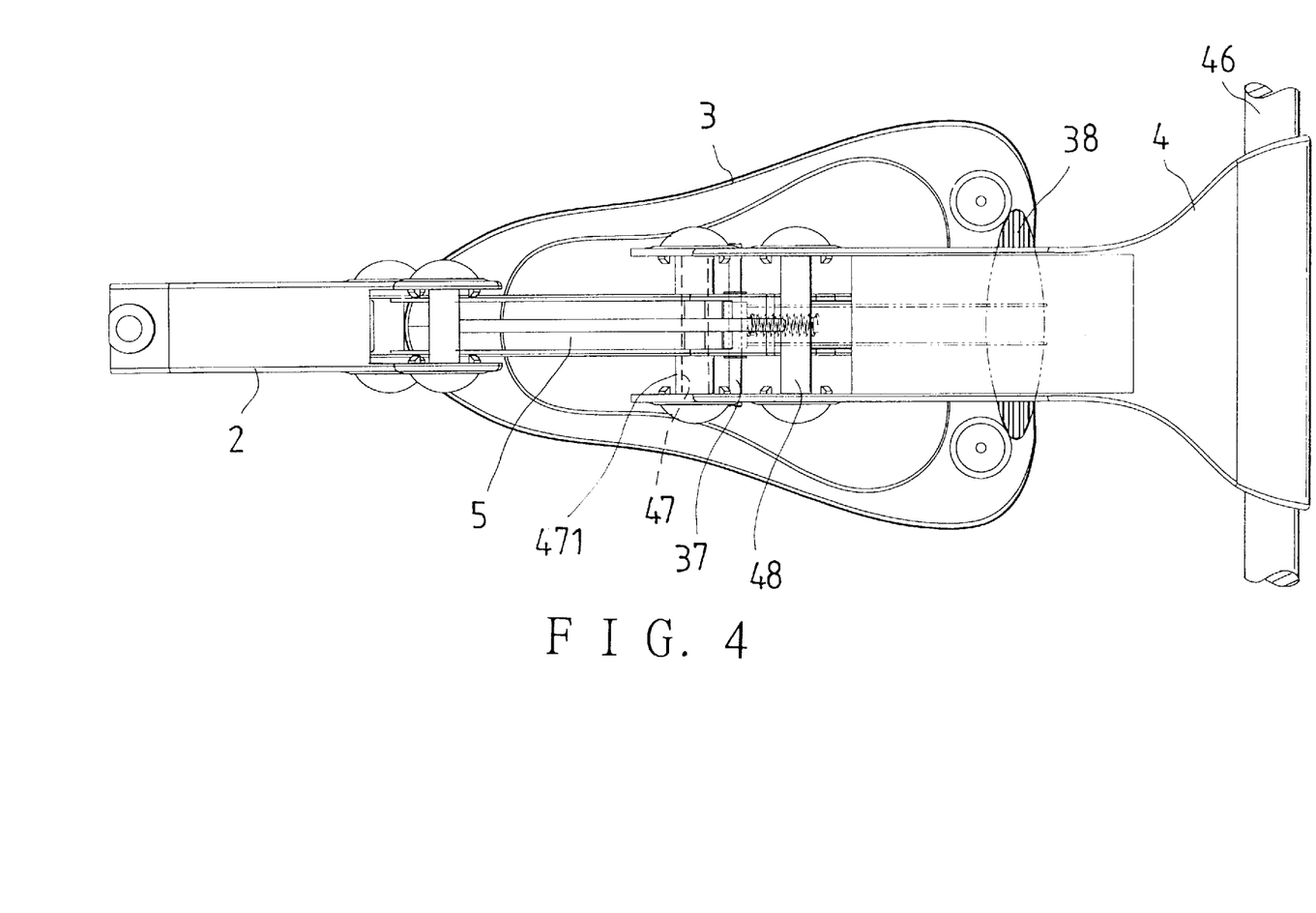
FIG. 4 is a fragmentary bottom view of the tricycle of the present invention.

In combination, the front extended parts 31 of the saddle 3 is pivoted to the upper pivotal holes 221 of the stationary frame part by passing a first pivotal rod 23 through pivotal holes 311 thereof and the pivotal holes 221. The connecting rod 5 is pivoted to the stationary frame part 2 by passing a second pivotal rod 24 through the lower pivotal holes 222 of the frame part 2 and the front end bashing 51 thereof and is pivoted to the lower pivotal holes 412 of the rear frame part 4 by passing a fourth pivotal rod 48 through the lower pivotal holes 412 and the rear end bushing 52 as shown in FIG. 3. The front portion of the rear frame part 4 is pivoted to the pivotal hole 33 of the saddle 3 by means of a third pivotal rod 47, which is passed through, the upper pivotal holes 411 and the pivotal hole 33 as well as two bushings 471 positioned on two ends of the pivotal hole 33 for preventing the saddle 3 from moving sideways relative to the rear frame part 4. Referring specifically to FIG. 3, when the tricycle is stretched to the in-use position, the lower opening of the receiving room 32 of the saddle 3 will abut a holding portion 431 on the front end of the interposed board part 4, and the engaging rod 37 of the control member is biased forwards to the locking position by the spring 36 so as to engage the first engaging gaps 413 of the rear frame part 4. Because of the engagement between the first engaging gaps 413 and the engaging rod 37 as well as the connecting rod 5 connecting the stationary part 2 to the rear frame part 4 the rear frame part 4 will not become loose or accidentally pivot to the folded position.

Figure 5:
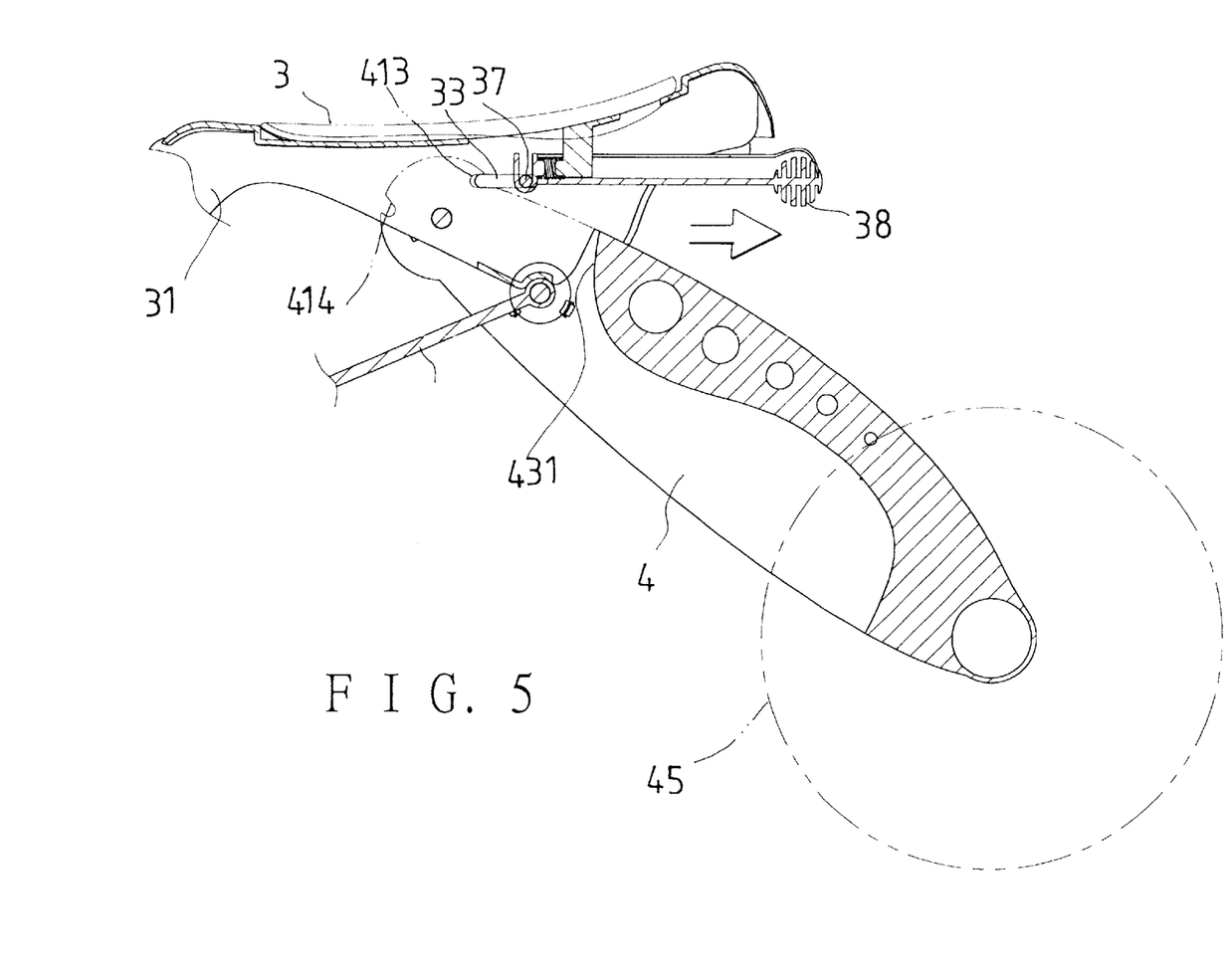
FIG. 5 is a view illustrating the use of the control member of the tricycle of the present invention.
Figure 6:
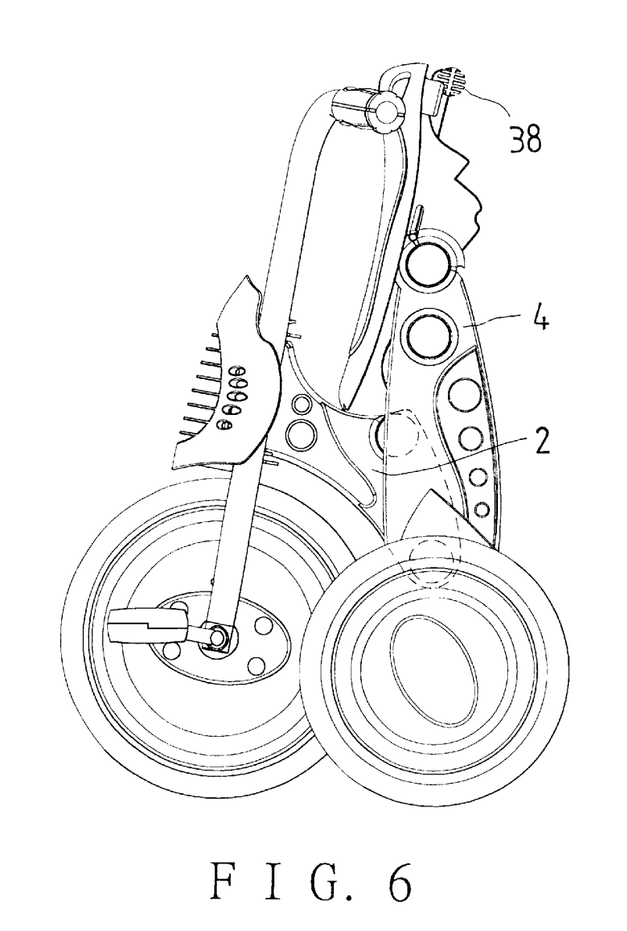
FIG. 6 is view of the tricycle of the present invention in the folded position.
Figure 7:
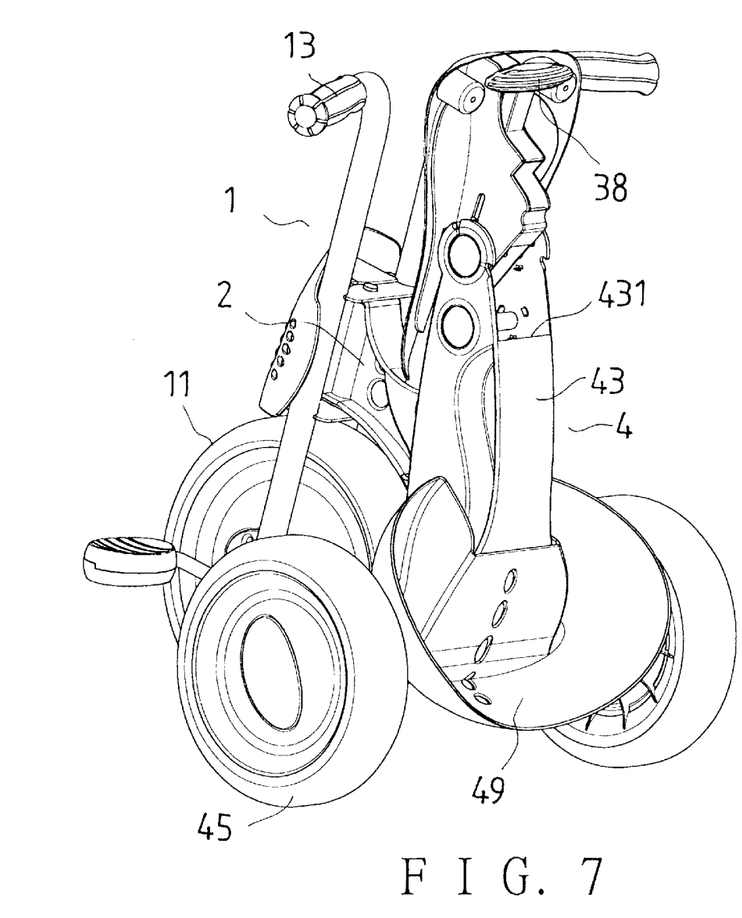
FIG. 7 is a perspective view of the tricycle of the present invention in the folded position.

Referring to FIGS. 5 and 6, to fold the tricycle to a not-in-use position, the pull handle 38 is pulled rearward of the tricycle for the engaging rod 37 to disengage the first engaging gaps 413, thus allowing the saddle 3 to pivot relative to the rear frame part 4. Thus, the saddle 3, the connecting rod 5, and the rear frame part 4 are pivoted to a substantially upright position with the rear part of the stationary part 2 being received in the receiving space of the rear frame part 4, and with the rear wheels 45 overlapping the front wheel 11; thus, the folded tricycle is relatively compact. The tricycle can be folded very easily by lifting the rear part of the saddle 3. When the tricycle is folded, the pull handle 38 is released for the spring 36 to bias the engaging rod 37 back to the locking position; thus, the rod 37 engaging the second engaging gaps 414 of the rear frame part 4 to secure the related components in position.

Moreover, when the tricycle is in the stretched position, the lower part of the saddle 3 defining the lower opening of the receiving room 32 will abut the holding portion 431 of the rear frame part 4 such that the saddle 3 is held on the rear frame part 4 with increased stability. And, referring again to FIG. 1, an object holding plate 49 can be secured to the rear frame part 4 for placing objects on.

From the above description, it can be easily understood that the tricycle of the present invention has the following desirable features:

1. The rear part of the bottom of the saddle 3 is held on the holding portion 431 of the rear frame part 4 so the saddle 3 is relatively stable as compared with that of the conventional tricycle, which is supported by a thin connecting rod 43 (FIG. 9).
2. The engagement between the engaging rod 37 of the control member and the engaging gaps 413 and 414 can prevent the tricycle from accidentally stretching from the collapsed position or being accidentally collapsed from the stretched position.
3. When a child rides the tricycle on a ground full of bumps and holes, or when the tricycle hits an object, no dangerous accidental folding would be caused.
4. Because the connecting rod 5 has the end bushings 51 and 52 for pivotal connection to the frame parts 2 and 4, it will not fall off.
5. Because the width of the receiving space of the rear frame part 4 is bigger than that of the stationary frame part 2, the rear part of the frame part 2 can be received in the receiving space for allowing the tricycle to be folded to a relatively compact size.

What is claimed is:

1. A collapsible tricycle for use of young children, comprising a front frame part connected to a front wheel and handlebars at a lower end and an upper end respectively;

a stationary frame part connected to said front frame part at a front portion;

a saddle;

a rear frame part;

a pair of rear wheels connected to a rear portion of said rear frame part; and characterized by a pair of parallel extended walls formed on a rear portion of said stationary frame part; said extended walls having upper and lower pivotal holes for a front portion of said saddle, and a front end of a connecting rod to be pivoted to respectively by means of pivotal rods passing through said pivotal holes;

a pair of parallel extended walls formed on said rear frame part, and an interposed board part connected to upper edges of said walls of said rear frame part;

said walls of said rear frame part defining a front space at said front portion, and defining a receiving space behind said front space; said interposed board part being formed in such manner as to allow said front space of said rear frame part to have an upper opening; said connecting rod being pivoted to second pivotal holes on front parts of said walls of said rear frame part from an rear end; said rear frame part being pivoted to said saddle, from first pivotal holes formed on front parts of said walls thereof;

a bottom of a rear part of said saddle being supported on a front holding portion of said interposed board part of said rear frame part when said tricycle is in a stretched in-use position.

2. The collapsible tricycle for use of young children as claimed in claim 1, wherein a width of receiving space of said rear frame part is bigger than that of said rear portion of said stationary frame part such that said rear portion of said stationary frame part can be received in said receiving space when said rear frame part is moved close to said stationary frame part for collapsing said tricycle.

3. The collapsible tricycle for use of young children as claimed in claim 1, wherein said saddle has a receiving room at said rear part, and said front parts of said walls of said rear frame part have first and second engaging gaps formed on edges; said receiving room of said saddle receiving an engaging rod biased forwards of said saddle to a locking position by a spring and connected to a pull handle positioned outside said saddle; said engaging rod engaging said first engaging gaps to fix said tricycle in said stretched in-use position, and engaging said second engaging gaps to fix said tricycle in a folded position; said engaging rod being disengaged from said gaps by pulling said pull handle, thus allowing said saddle, said frame parts to pivot on each other.

4. The collapsible tricycle for use of young children as claimed in claim 1, wherein said rear frame part is pivoted to said saddle, from said first pivotal holes by means of passing a pivotal rod through said first pivotal holes, and a pivotal hole of said saddle; two bushings being each positioned at one end of said pivotal hole of said saddle for said pivotal rod to pass through, thus preventing said rear frame part from moving sideways relative to said saddle.

5. The collapsible tricycle for use of young children as claimed in claim 3, wherein a rear part of said spring is secured in position by a securing block formed in said saddle, and said saddle has elongated slots for allowing two ends of said engaging rod to pass through, thus guiding a movement of said engaging rod.

* * * * *